United States Patent

[11] 3,621,019

| [72] | Inventors | Upendra Kumar Pandit<br>Slichtstraat 41, Amsterdam;<br>Henderikus Obias Huisman, de Savornin<br>Lohmanlaan 20, Amstelveen, both of<br>Netherlands |
|---|---|---|
| [21] | Appl. No. | 855,041 |
| [22] | Filed | Sept. 3, 1969 |
| [45] | Patented | Nov. 16, 1971 |

[54] STEROID INTERMEDIATES
5 Claims, No Drawings

[52] U.S. Cl.................................................260/247.7 C,
 260/294.7 M, 260/326.5 M, 260/397.4,
 260/590, 260/999
[51] Int. Cl.........................................................C07d 87/32,
 C07d 27/04
[50] Field of Search.......................................... 260/326.5
 M

[56] References Cited
UNITED STATES PATENTS
3,318,907  5/1967  Pappo ........................... 260/326.5

*Primary Examiner*—Alex Mazel
*Assistant Examiner*—Joseph A. Narcavage
*Attorneys*—Herbert W. Taylor, Jr., Robert E. Havranek, Robert H. Brink and James Magee, Jr.

ABSTRACT: The total syntheses of steroids has become a reality and more recently has become commercially feasible. The present invention is an improvement on the currently employed techniques and involves the use of an enamine of the tetralone rather than the tetralone itself as a critical intermediate in the total synthesis. The advantage of the method is improved yields.

STEROID INTERMEDIATES

BACKGROUND OF THE INVENTION

1. Field of the Invention

The intermediates of the present invention were heretofore unknown and are especially useful in the total synthesis of biologically active steroids; the advantage of their use being higher yields of finished product.

2. Description of the Prior Art

Methods of total synthesis of steroids have been known for several years now. Since the pioneers in the field [S. N. Ananchenko and I. V. Torgov, Tetrahedron Letter, 1553 (1963) and H. Smith et al., J. Chem. Soc., 4472 (1964)] led the way, many have worked to perfect the method with notable degrees of success. This current application is devoted to a further improvement.

SUMMARY OF THE INVENTION

Compounds having the formula

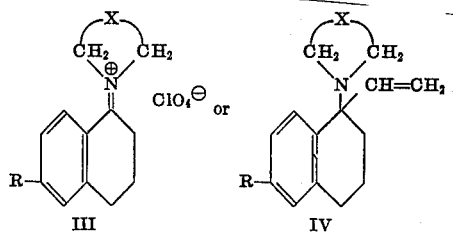

in which R is (lower)alkoxy and X is $-(CH_2)_2-$, $-(CH_2)_3-$ or $-CH_2-CH_2-$, are useful intermediates in the total synthesis of steroids having hormonal activity.

This invention relates to an improved method of total synthesis of steroids by the utilization of two new and novel intermediates. The use of the new intermediates results in greater yields of the final steroid product. The reaction scheme is as follows:

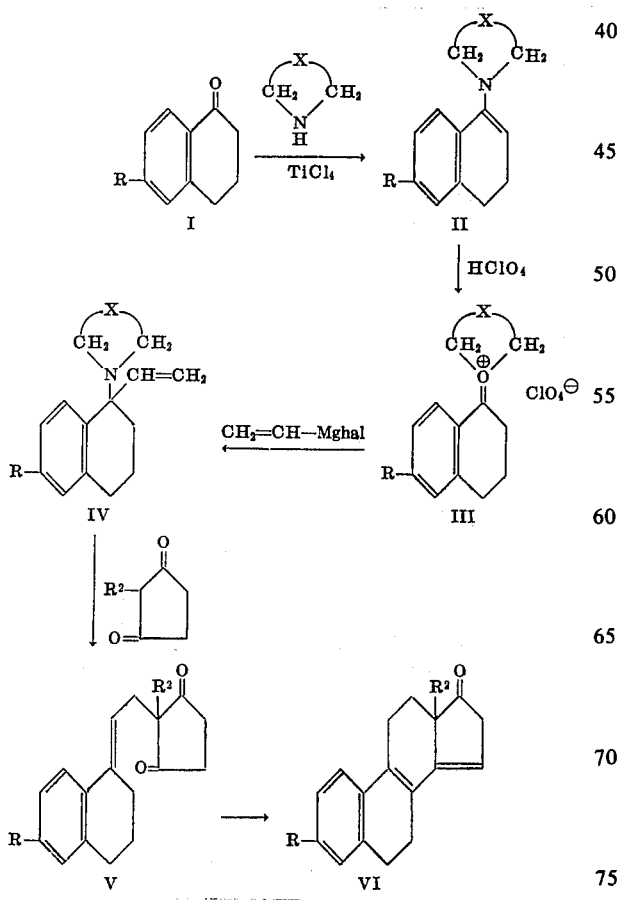

wherein R is (lower)alkoxy, X is $-(CH_2)_2-$, $-(CH_2)_3-$, or $-CH_2-O-CH_2-$, hal is a halogen, i.e., Cl, Br or I and $R^2$ is (lower)alkyl.

The reaction sequence as conducted in the prior art is as follows:

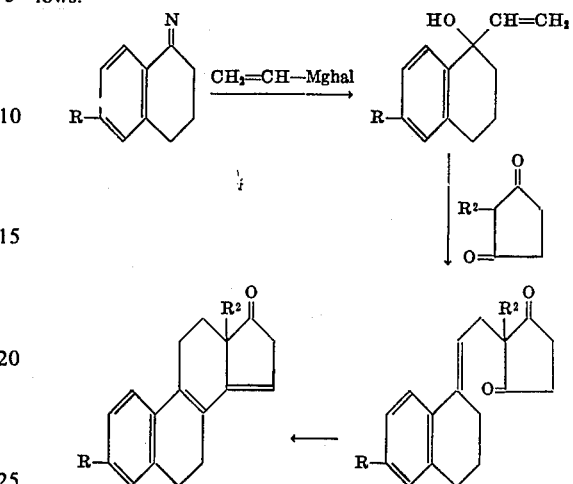

The improvement herein is the use of the key intermediates III an IV.

A preferred embodiment of the present invention is the compound having the formula

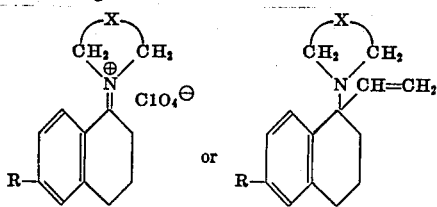

wherein R is (lower)alkoxy and X is $-(CH_2)_2-$, $-(CH_2)_3-$, or $-CH_2-CH_2-$.

A more preferred embodiment of the present invention is the compound having the formula

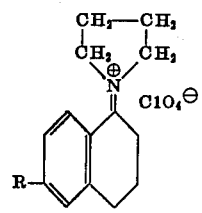

wherein R is (lower)alkoxy.

Another more preferred embodiment of the present invention is the compound having the formula

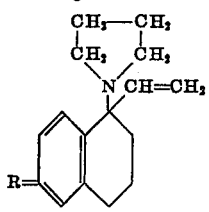

A most preferred embodiment of the present invention is the compound having the formula

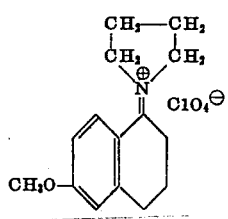

Another most preferred embodiment of the present invention is the compound having the formula

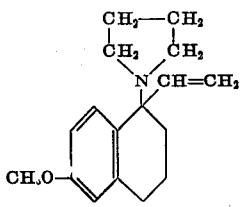

A more preferred embodiment of the present invention is the compound having the formula

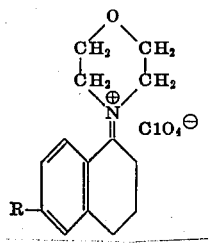

wherein R is (lower)alkoxy.

Another more preferred embodiment of the present invention is the compound having the formula

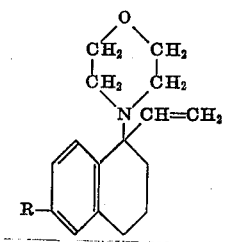

wherein R is (lower)alkoxy.

A most preferred embodiment of the present invention is the compound having the formula

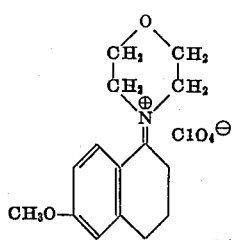

Another most preferred embodiment of the present invention is the compound having the formula

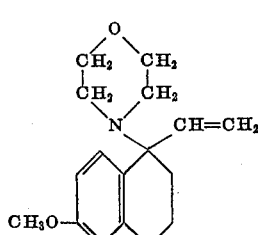

For the purpose of this disclosure, the term "(lower)alkoxy'' is defined as an alkoxyl group consisting of from one to eight carbon atoms and shall include straight chain and branched chain alkoxyl groups such as methoxy, ethoxy, propoxy, isopropoxy, butoxy, etc. The term "(lower)alkyl" is similarly defined and includes methyl, ethyl, propyl, isopropyl, etc.

DESCRIPTION OF THE PREFERRED EMBODIMENTS

EXAMPLE 1

Preparation of 3-Methoxyestra-1,3,5(10),8,14-pentaene-17-one

A. Synthesis of The Pyrrolidinoenamine of 6-Methoxytetralone

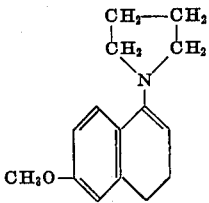

(A)

To a solution of 6-methoxytetralone (0.1 mol) (Ia) and pyrrolidine (0.4 mol) in 600 ml. of dry benzene, cooled to 0°–10° C., was added $TiCl_4$ (0.06 mol) dissolved in 100 ml. of benzene, with stirring, at a rate which allowed the temperature reaction mixture to stay below 10° C. The mixture turned dark and the precipitation of $TiO_2$ and pyrrolidine hydrochloride was observed. The reaction mixture was stirred overnight, the solids removed by filtration and the solvent evaporated from the product. The product was redissolved in benzene and refiltered to further remove residual salts. Removal of the solvent and distillation of the residue gave the pure enamine in 70–80 percent yield, b.p. 138°–140° C./0.01 mm., $\nu_{max.}^{neat.}$:1615 (N–C=C)$\delta^{CDCl_3}$ 5.09 t (1H, C=C–H, J=5 c/s).

Anal. Calc'd. for $C_{15}H_{19}NO$: C, 78.56; H, 8.38; N, 6.11. Found: C, 78.52; H, 8.41; N, 5.88.

B. Preparation of Enamine Perchlorate

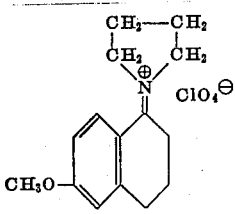

(B)

The pyrrolidine enamine above (A), (0.1 mol) was dissolved in about 50 ml. of glacial acetic acid containing 10 percent acetic anhydride. To this solution was added, dropwise, 0.1M $HClO_4$ (0.1 mol), with stirring under nitrogen. After allowing the mixture to stir overnight, the salt was filtered under nitrogen and washed several times with dry ether. The yield of the pure perchlorate was over 80 percent, $\nu_{max.}^{KBr.}$ 1615, 1590, 1085. $\lambda_{max.}^{CHCl_3}$ $\lambda$325 (22,500).

C. Vinylation of Enamine Perchlorate:

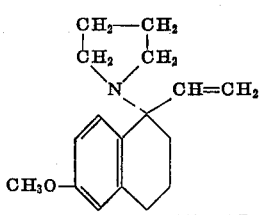

(C)

The perchlorate salt (0.1 mol) above (B) was added to a 10fold excess of vinylmagnesium bromide in carefully purified and dried tetrahydrofuran (THF). After the addition was completed, the mixture was poured into ice-water mixture and extracted with benzene-ether (2:1). The organic layer was washed, dried and evaporated to give an oil which consisted of a 1:1 mixture of tetralone (IA) and 1-vinyl-1-pyrrolidinyl-tetrahydronaphthalene (C). "C" was isolated by dissolving the oil in ether, extracting with 10 percent ice-cold hydrochloric acid and then liberating "C" by neutralization with 10 percent sodium hydroxide at 0° C. The oil was recovered by extraction with ether, followed by washing, separation and removal of solvent in vacuo. The oily product which was obtained in 82 percent yield (calculated on the basis of recovered tetralone) showed spectral data in agreement with structure "C," and was further identified as its picrate; m.p. 103°–104° C.

Anal. calc'd. for $C_{23}H_{26}N_4O_8$: C, 56,78; H, 5.39; N, 11.52.
found: C, 56.81; H, 5.49; N, 11.40.

D. Syntheses of 8,14-Seco-steroid

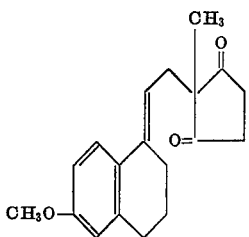

(D)

A mixture of "C" above, (0.9 mmol), and 2-methyl-cyclopentanedione-1.3 (1.4 mmol) in 5 ml. of methanol was refluxed under nitrogen for 16 hours. The methanol was removed from the reaction mixture and the residue dissolved in ether. The ether solution was extracted with ice-cold 5 percent KOH (to remove excess of the diketone), washed with water, dried and evaporated to give oily "D" in 80 percent yield. The infrared (IR) and nuclear magnetic resonance (NMR) spectra of the product were identical to a sample of V prepared by the procedure of Ananchenko and Torgov [S. N. Ananchenko and I. V. Torgov, Tetrahedron Letters, 1553 (1963) ] or H. Smith et al. J. Chem. Soc., 4472 (1964).

E. Cyclization of "D" to "E"

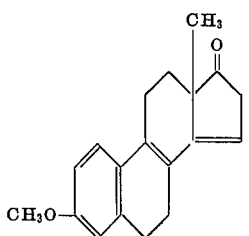

(E)

Product "D" was treated with an acid catalyst, preferably in xylene with p-toluenesulfonic acid to produce the product 3-methoxyestra-1,3,5(10), 8,14- pentaene-17-3-one, m.p. 108°–110° C., said product being identical to that described in the literature [S. N. Ananchenko and I. V. Torgov, Tetrahedron Letters, 1553 (1963) and H. Smith et al. J. Chem. Soc., 4472 (1964)].

EXAMPLE 2

Preparation of 13β-Ethyl-3-Methoxygona-1,3,5(10),8,14-pentaene-17-one

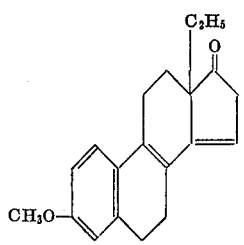

Substitution in the procedure of example 1, part D and E, for the 2-methylcyclopentane-1,3-dione used therein of 2-ethyl-cyclopentane-1,3-dione produced the product 3β-ethyl-3-methoxygona-1,3,5(10), 8,14-pentaene-17-one, m.p. 68°–70 C. which have been reported in the literature [H. Smith et al. J. Chem. Soc., 4472 (1964) ].

EXAMPLE 3

Preparation of Morpholino enamine of 3-Methoxytetralone

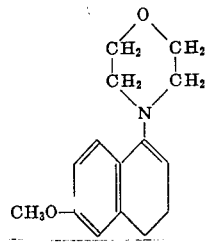

Substitution in the procedure of example 1, part A, for the pyrrolidine used therein of morpholine, produced the pure morpholino enamine of the tetralone, b.p. 116°–118° C./0.02 mm. $\nu_{max}^{neat}$ 1620 (N–C=C); $\delta^{CDCl_3}$ 5.19 t (1H, C=C–H, J=4.5 c/s).

Anal. calc'd. for $C_{15}H_{19}NO_2$: C, 78.10; H, 7.96; N, 6.51.
Found: C, 77.92; H, 8.11; N, 6.34.

EXAMPLE 4

Synthesis of 3-Methoxyestra-1,3,5(10),8,14-pentaene-17-one via the Morpholino Enamine of 6-Methoxytetralone Substitution in example 1, parts B through E, for the pyrrolidino enamine used therein of the morpholino enamine of example 3, produced the desired 3-methoxyestra—1,3,5(10), 8,14-pentaene-17-one which was identical to that obtained in example 1, part E.

EXAMPLE 5

Synthesis of 3-Methoxy-estra-1,3,5(10), 8,14-pentaene-17-one via the Piperidino Enamine of 6-Methoxytetralone Substitution in example 1, parts A through E, for the pyrrolidine used therein of piperidine, produces the desired 3-methoxyestra-1,3,5(10,8,14-pentaene-17-one.

We claim:

1. A compound having the formula

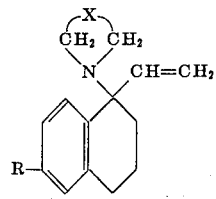

wherein R is (lower)alkoxy and X is $-(CH_2)_2-$, $-(CH_2)_3-$ or $-CH_2-O-CH_2-$.

2. A compound of claim 1 having the formula

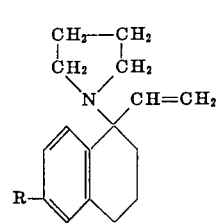

wherein R is (lower)alkoxy.

3. A compound of claim 1 having the formula

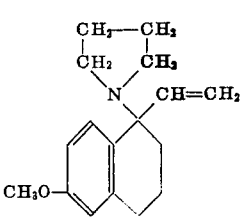

4. A compound of claim 1 having the formula
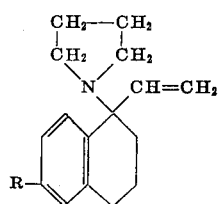
wherein R is (lower)alkoxy.
5. A compound of claim 1 having the formula
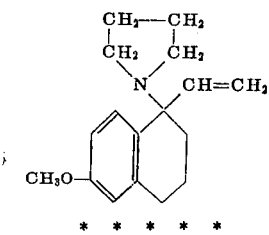
* * * * *

PO-1050
(5/69)

UNITED STATES PATENT OFFICE
CERTIFICATE OF CORRECTION

Patent No. 3,621,019      Dated November 16, 1971

Inventor(s) Upendra Kumar Pandit and Henderikus Obias Huisman

It is certified that error appears in the above-identified patent and that said Letters Patent are hereby corrected as shown below:

In the claims, the formula of claim 4 should read as follows:

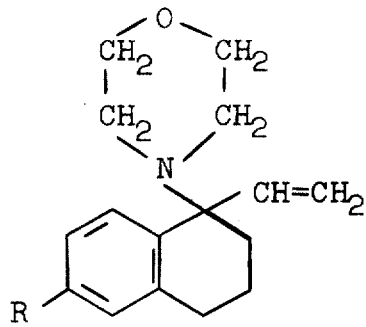

In the claims, the formula of claim 5 should read as follows:

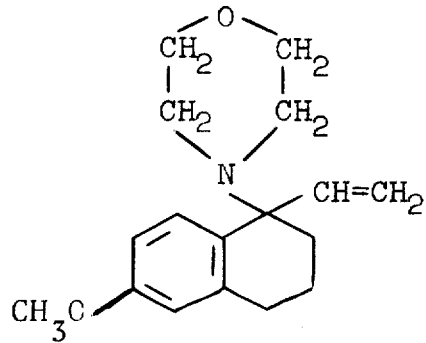

Signed and sealed this 6th day of June 1972.

(SEAL)
Attest:

EDWARD M. FLETCHER, JR.
Attesting Officer

ROBERT GOTTSCHALK
Commissioner of Patents